United States Patent
Shibata et al.

(10) Patent No.: US 7,780,143 B2
(45) Date of Patent: Aug. 24, 2010

(54) GATE VALVE

(75) Inventors: Yasunari Shibata, Nagasaki (JP);
Yoshinori Koyama, Nagasaki (JP);
Soken Takase, Nagasaki (JP); Taizo Hoshino, Uonuma (JP); Shuji Kameyama, Iwaki (JP); Yasuhiro Suzuki, Iwaki (JP); Yoshihiko Horie, Iwaki (JP); Hitoshi Terada, Iwaki (JP); Hirofumi Yamada, Iwaki (JP)

(73) Assignees: Mitsubishi Heavy Industries, Ltd., Tokyo (JP); Hirata Valve Industry Co., Ltd., Kawasaki-shi (JP); Clean Coal Power R&D Co., Ltd., Iwaki-shi (JP); Hokkaido Electric Power Co., Incorporated, Sapporo (JP); Tohoku Electric Power Co., Inc., Sendai (JP); The Tokyo Electric Power Co., Inc., Tokyo (JP); Chubu Electric Power Co., Inc., Nagoya-shi (JP); Hokuriku Electric Power Co., Toyama-shi (JP); The Kansai Electric Power Co., Inc., Osaka (JP); The Chugoku Electric Power Co., Inc., Hiroshima (JP); Shikoku Electric Power Co., Inc., Takamatsu (JP); Kyushu Electric Power Co., Inc., Fukuoka-shi (JP); Electric Power Development Co., Ltd., Tokyo (JP); Central Research Institute of Electric Power Industry, Tokyo (JP)

( * ) Notice: Subject to any disclaimer, the term of this patent is extended or adjusted under 35 U.S.C. 154(b) by 430 days.

(21) Appl. No.: 11/987,309

(22) Filed: Nov. 29, 2007

(65) Prior Publication Data

US 2009/0140195 A1 Jun. 4, 2009

(51) Int. Cl.
*F16K 25/00* (2006.01)

(52) U.S. Cl. .................. 251/203; 251/193; 251/326

(58) Field of Classification Search ............. 251/193, 251/203, 204, 326, 327, 328, 159
See application file for complete search history.

(56) References Cited

U.S. PATENT DOCUMENTS

| 1,738,450 | A | * | 12/1929 | Ryan et al. | .............. 251/159 |
| 1,813,418 | A | * | 7/1931 | O'Leary et al. | .............. 138/45 |
| 2,946,349 | A | * | 7/1960 | Hamer | .............. 138/94.3 |
| 3,669,149 | A | * | 6/1972 | Guichon | .............. 137/625.48 |

FOREIGN PATENT DOCUMENTS

JP 54-142625 A 11/1979

(Continued)

OTHER PUBLICATIONS

Japanese Office Action dated Mar. 5, 2010, issued in corresponding Japanese Patent Application No. 2005-167773.

*Primary Examiner*—John K Fristoe, Jr.
*Assistant Examiner*—Marina Tietjen
(74) *Attorney, Agent, or Firm*—Westerman, Hattori, Daniels & Adrian, LLP

(57) ABSTRACT

An object is to provide a gate valve capable of preventing operational deficiencies caused by particulate materials accumulating in a valve box, thus providing superior sealing properties and high durability, having a simple structure, and allowing inspection and maintenance to be performed easily. A gate valve installed in a transport line for transporting fluid containing particulate material at a coal gasification plant includes a valve box having an inlet portion and an outlet portion in which a channel constituting a part of the transport line is formed; a valve unit, provided between the inlet portion and the outlet portion, which extends in an opening-and-closing direction orthogonal to an axial direction of the channel, and which is movable in the opening-and-closing direction; a wedge plate provided between the valve unit and the inlet portion so as to extend in the opening-and-closing direction; and a guide plate provided between the valve unit and the outlet portion so as to extend in the opening-and-closing direction. Areas between the valve unit and the wedge plate and between and the valve unit and guide plate are sealed by means of surface contact.

6 Claims, 9 Drawing Sheets

FOREIGN PATENT DOCUMENTS

| | | |
|---|---|---|
| JP | 56-67462 U | 6/1981 |
| JP | 5-141548 A | 6/1993 |
| JP | 5-196153 A | 8/1993 |
| JP | 2003-90459 A | 3/2003 |
| JP | 2004-239284 A | 8/2004 |
| JP | 2006-342859 A | 12/2006 |

* cited by examiner

GATE VALVE

BACKGROUND OF THE INVENTION

1. Field of the Invention

The present invention relates to gate valves disposed in transport lines for transporting fluids containing mainly particulate materials, at coal gasification plants where coal is gasified and used as fuel for gas turbines and other devices.

2. Description of Related Art

Conventionally, coal gasification plants have been drawing attention because they make efficient use of abundant coal reserves. These types of coal gasification plants have transport lines for transporting fluids containing particulate materials, such as coal used as a fuel for a gasification furnace or unburned compounds generated from at the gasification furnace, between each constituent device. Valves for shutting off and sealing the fluids are provided to ensure operational control and safety of the plants.

With valves operated in such a particulate material environment, particulate materials enter the valve box and accumulate therein, which possibly obstructs the operation of a valve unit. Accordingly, measures for preventing the particulate materials from entering the valve box are required.

In addition, in some cases, sealing characteristics at high temperature and high pressure and durability in high-frequency operations are required at the same time, depending on the operating conditions at the plant.

Because the lines used for transporting fluids containing particulate materials usually have a large valve bore, it is not easy to remove the valve from the system. Accordingly, it is desirable that the valves have a structure that allows parts to be easily changed while remaining installed during inspection or maintenance of the valve.

In the related art, a through-conduit gate valve disclosed, for example, in Japanese Unexamined Patent Application, Publication No. HEI 5-141548 has been proposed as a valve for particulate materials used for preventing the particulate materials from entering gaps in the valve box and accumulating therein. This type of valve has a secondary seal, outside a primary seal, that seals the channel and the valve box of the known through-conduit gate valve to prevent the particulate materials from entering the valve box.

A known gate valve in which a seal is subjected to lower wear by abrasive fluids is a slurry gate valve disclosed, for example, in Japanese Unexamined Patent Application, Publication No. HEI 5-196153.

This type of gate valve has multiple gate plates that sequentially open; first, it shuts off fluids with an upstream gate plate and then operates a downstream gate plate to prevent a sealing portion on the downstream side from being damaged while the gate plate is partially opened.

In addition, a known gate valve that is less complex and externally adjustable without disassembling the valve is disclosed in, for example, Japanese Unexamined Patent Application, Publication No. SHO-54-142625. FIG. 11 shows the structure of a gate valve 100 disclosed in Japanese Unexamined Patent Application, Publication No. SHO-54-142625.

With this gate valve, the front and rear of a valve element 105 that has an opening portion 103 and a closing portion 101 are flanked by a main valve seat 107 and a sub valve seat 109, and a seal around a channel 111 is provided in front of and behind the main valve seat 107 and the sub valve seat 109, respectively. It is constructed so that the main valve seat 107 is moved back and forth using a bolt 113 to maintain surface pressure on a contact surface by the effect of a wedge. The gate valve 100 is opened and closed by the valve element 105 moving upward and downward.

However, the gate valve disclosed in Japanese Unexamined Patent Application, Publication No. HEI-5-141548 has a complex double sealing structure, and a seal is disposed on a moving portion; therefore, there is a problem in that the seal has low durability and is easily damaged.

The gate valve disclosed in Japanese Unexamined Patent Application, Publication No. HEI-5-196153 cannot prevent fluids from entering a valve box in a partially opened state. Accordingly, when the valve is used for fluids containing particulate materials, there is a problem in that motion of the gate valve is prevented due to the particulate materials accumulating in the valve box.

The gate valve disclosed in Japanese Unexamined Patent Application, Publication No. SHO-54-142625, similar to Japanese Unexamined Patent Application, Publication No. HEI-5-196153, also cannot prevent a fluid from entering a valve box in a partially opened state; therefore, there is a problem in that the operation of the gate valve 100 is disturbed by the particulate materials accumulating in the valve box when the fluid contains particulate materials.

When the gate valve 100 is used at high temperatures, a contact surface pressure exerted on the valve element 105 by the main valve seat 107 is adjusted by screwing the bolt 113; therefore, it is not possible to provide a seal with an accurate gap size for absorbing thermal expansion of the valve box body 115 generated at high temperatures. In addition, when loosening the main valve seat 107, the main valve seat 107 does not follow the bolt 113 even when it is loosened; therefore, there is a problem in that the main valve seat 107 and the valve element 105 cannot be secured.

In addition, because the sealing gasket 117 is provided on a sliding surface of the valve element 105, particulate materials easily enter the sealing gasket 117 and adhere thereto. When sliding in this state, the sealing gasket 117 is liable to be damaged and has low durability. Accordingly, it is difficult to maintain the sealing function.

Furthermore, there is a problem in that a complicated procedure is required to disassemble the valve in inspection and maintenance, namely, removing a cover 119, pulling out the main valve seat 107, removing an upper flange 121, and taking out the valve element 105 and the sub valve seat 109.

BRIEF SUMMARY OF THE INVENTION

The present invention has been conceived in light of the problems of the related art described above, and an object thereof is to provide a gate valve capable of preventing operational deficiencies caused by accumulating particulate materials in a valve box, thus providing superior sealing properties and high durability, having a simple structure, and allowing inspection and maintenance to be performed easily.

In order to solve the problems described above, the present invention employs the following solutions.

A first aspect of the present invention provides a gate valve installed in a transport line for transporting fluid containing particulate material at a coal gasification plant, comprising a valve box having an inlet portion and an outlet portion in which a channel constituting a part of the transport line is formed; a valve unit, provided between the inlet portion and the outlet portion, which extends in an opening-and-closing direction orthogonal to an axial direction of the channel and which is movable in the opening-and-closing direction; a wedge plate provided between the valve unit and the inlet portion so as to extend in the opening-and-closing direction; a guide plate provided between the valve unit and the outlet portion so as to extend in the opening-and-closing direction; and a moving device engaged with the valve unit and configured to move the valve unit in the opening-and-closing direction, wherein the valve unit is provided with a first sliding surface at the inlet portion side and a second sliding surface at the outlet portion side, which are substantially orthogonal to the channel and substantially parallel to each other, and a valve unit channel passing through so as to form a part of the channel is provided closer to a first end than a midpoint in the opening-and-closing direction; the wedge plate is provided with a third sliding surface that is in surface contact with the first sliding surface at the valve unit side and an inclined supporting surface which is provided closer to a second end than substantially the midpoint in the opening-and-closing direction at the inlet portion side and whose height gradually reduces toward the second end, and a wedge-plate channel that passes from the inclined supporting surface toward the third sliding surface and that forms a part of the channel is provided so that the third sliding surface has a length equal to or greater than the diameter of at least the valve unit channel at the first end in the opening-and-closing direction; the guide plate is provided with a fourth sliding surface that is in surface contact with the second sliding surface at the valve unit side, and a guide-plate channel that passes through so as to form a part of the channel is provided so that the fourth sliding surface has a length equal to or greater than the diameter of at least the valve unit channel at the first end in the opening-and-closing direction; an inclined surface opposing the inclined supporting surface is formed at an inner end portion of the inlet portion; a first sealing member having elasticity is mounted between the inclined surface and a wedge-plate annular groove provided around the wedge-plate channel of the inclined supporting surface; a second sealing member having elasticity is mounted between the guide plate and the outlet portion so as to surround the channel; and the valve box is provided with a first urging member capable of urging the wedge plate to the second end in the opening-and-closing direction, and a second urging member that is disposed at the second end, in the opening-and-closing direction, of the first urging member and that is capable of urging the wedge plate to the first end in the opening-and-closing direction.

According to this aspect, the fluid channel is formed by the channels of the inlet portion and the outlet portion, the wedge-plate channel, and the guide-plate channel. When the valve unit is slid by the moving device, and when the valve unit channel overlaps with the wedge-plate channel of the wedge plate and the guide-plate channel of the guide plate, the channel is formed so as to pass through; that is, the gate valve is opened. In this state, when the valve unit is slid, by the moving device, to the first end in the opening-and-closing direction along the wedge plate and the guide plate, the valve unit channel moves to the first end, and the overlapping portion of the wedge-plate channel of the wedge plate and the guide-plate channel of the guide plate gradually decreases in size, and finally they do not overlap. In other words, the gate valve is closed.

At this time, the channel formed by the inlet portion and the wedge-plate channel of the wedge plate is sealed by the first sealing member, and the channel formed by the outlet portion and the guide-plate channel of the guide plate is sealed by the second sealing member.

The wedge plate is provided with a third sliding surface having a length equal to or greater than the diameter of at least the valve unit channel at the first end of the wedge-plate channel in the opening-and-closing direction. The guide plate is provided with a fourth sliding surface having a length equal to or greater than the diameter of at least the valve unit channel at the first end of the guide-plate channel in the opening-and-closing direction. Accordingly, the valve unit channel is covered by the third sliding surface and the fourth sliding surface until the gate valve is closed. In other words, the opening plane of the valve unit channel is covered by the third sliding surface and the fourth sliding surface at all times during the opening and closing operation of the gate valve.

Because the valve unit channel is provided closer to the first end than the midpoint of the valve unit in the opening-and-closing direction, the first sliding surface and the second sliding surface, which are longer than the diameter of the valve unit channel, are provided at the second end of the valve unit channel. Accordingly, the wedge-plate channel is covered and sealed by the first sliding surface of the valve unit, and the guide-plate channel is covered by the second sliding surface of the valve unit during the time when the gate valve is closed by sliding the valve unit.

In this way, because a portion between the channel and inside the valve box is sealed at all degrees of opening, it is possible to prevent the fluid containing particulate materials transmitted through the channel from entering the valve box and accumulating therein.

The movable portions, i.e., the portions between the valve unit and the wedge plate and between the valve unit and the guide plate, are sealed by making surface contact with each of the sliding surfaces, thus allowing high durability and improved sealing efficiency.

According to this aspect, when the wedge plate is urged to the second end in the opening-and-closing direction by the first urging member, the first sealing member is compressed because the inclined supporting surface of the wedge plate approaches the inclined surface of the inlet portion. When the first sealing member is compressed, the wedge plate is pressed against the valve unit by its restoring force. Because this pressing force is transmitted from the valve plate to the guide plate, and further transmitted from the guide plate to the second sealing member, it is possible to increase the contact pressure between the first sealing member and the second sealing member and the contact surface force between the valve unit and the wedge plate and between the valve unit and the guide plate. This increased-force state can be maintained by urging the wedge plate to the second end using the second urging member.

On the other hand, by loosening the first sealing member and urging the wedge plate to the first end in the opening-and-closing direction using the second sealing member, the first sealing member expands because the inclined supporting surface of the wedge plate is separated from the inclined surface of the inlet portion.

When the first sealing member expands, the pressing force of the first sealing member decreases; therefore, it is possible to decrease the contact pressure of the first sealing member and the second sealing member, and the contact surface force between the valve unit and the wedge plate and between the valve unit and the guide plate. This reduced-force state can be maintained by operating the first urging member to urge the wedge plate to the first end.

In this way, by operating the first urging member and the second urging member to adjust the position of the wedge plate as necessary, the contact pressure of the first sealing member and the second sealing member, and the contact surface force between the valve unit and the wedge plate and between the valve unit and the guide plate can be adjusted, and that state be maintained.

In the aspect of the invention described above, the moving device may be disposed at one of the first end and the second end of the valve unit and is detachably engaged with the valve unit; and an opening portion capable of opening and closing may be provided at an opposite side, in the opening-and-closing direction, from the moving device of the valve box.

Accordingly, by opening the opening portion, and by visually inspecting the sliding paths of the wedge plate and the guide plate, and determining the degree of wear and tear to the sliding surfaces, including the valve unit or other parts, it is possible to determine in advance whether or not inspection is required. In addition, by checking for particulate materials left inside the valve box, it is possible to determine whether or not it is necessary to perform adjustment and inspection of the contact pressure of the first sealing member and the second sealing member, and the contact surface force between the valve unit and the wedge plate and between the valve unit and the guide plate.

By opening the opening portion, and by separating the moving device from the valve, the valve unit can be removed from the opening portion, and then the wedge plate and the guide plate can be removed from the opening portion. Accordingly, maintenance, such as inspection, replacement, and assembly, can be performed inside the valve box without removing the valve box from the pipe in which it is installed.

In the aspect of the invention described above, coating layers may be provided on the first sliding surface, the second sliding surface, the third sliding surface, and the fourth sliding surface.

Because coating layers are provided on the first sliding surface, the second sliding surface, the third sliding surface, and the fourth sliding surface, the sealing properties of these sliding surfaces can be maintained for a long time even when they slide in high-temperature, corrosive environments, as well as in particulate environments.

Materials having excellent wear-resistance, corrosion-resistance, and mechanical sliding characteristics is suitable for the coating layers, for example, chromium carbide ($Cr_3C_2$).

In the aspect of the invention described above, the first sealing member and the second sealing member may be formed of spiral wound gaskets having a plurality of elasticities in a channel axial direction and a metal sealing plate interposed between each spiral wound gasket.

Because the first sealing member and the second sealing member are formed of the spiral wound gaskets having a plurality of elasticities in the channel axial direction and the metal sealing plate interposed between each spiral wound gasket, the thermal expansion of the valve box is distributed and absorbed by the plurality of the spiral wound gaskets. Accordingly, the thermal expansion applied to each of the spiral wound gaskets is within an elastic limit. It is possible to prevent a large contact surface force from being applied to the first sliding surface, the second sliding surface, the third sliding surface, and the fourth sliding surface, allowing operability to be improved.

Air-tightness can be maintained by the sealing plate even when the spiral wound gasket is deformed.

In the aspect of the invention described above, the channel may be formed in substantially the vertical direction such that the outlet portion is disposed at a lower end thereof; the second-end portion of the guide plate may be disposed so as to extend closer to the second end than the guide-plate channel; the valve box may be provided with a holding portion, between the valve box and the guide plate, substantially below the end at the first end of the guide plate, with a gap therebetween to allow thermal expansion of the valve box; and a spring having a spring force for supporting weights of the guide plate, the valve unit, and the wedge plate may be disposed between the holding portion and the guide plate.

Because the second-end portion of the guide plate extends closer to the second end than the guide-plate channel, even when the valve unit has a center of gravity closer to the second end than the valve unit channel, the valve unit is always guided by the guide plate and stably slides.

Because the wedge plate and the guide plate are disposed closer to the first end, the center of gravity of the wedge plate, the valve unit, and the guide plate is positioned closer to the first end than the guide-plate channel. A downward moment is thus always exerted at the first-end portion of the guide plate while the valve unit is sliding.

Because this downward moment is supported by the spring provided between the holding portion and the guide plate, the guide plate, the valve unit, and the wedge plate are always kept horizontal; thus, the valve plate operates stably.

Because the holding portion is provided, substantially below the end at the first end of the guide plate, with a gap between the guide plate and the holding portion to allow thermal expansion of the valve box, the holding portion does not abut against and press the guide plate upward, even when the valve box thermally expands.

In the aspect of the invention described above, a leading plate may be removably provided on an inner surface of the valve box opposing the valve unit, with a small gap therebetween.

Because the leading plate is provided on an inner surface of the valve box that the valve unit faces, with a small gap therebetween, even when the valve unit rocks due to the presence of a small amount of particulate materials, it abuts against only the leading plate, which prevents the problem of abutting against the valve box.

Because the leading plate is provided on the valve box in a detachable manner, when the valve plate becomes worn due to contact and sliding, maintenance can be easily carried out by changing only the leading plate.

According to the present invention, between the channel and inside the valve box, it is possible to prevent the fluid containing particulate materials transmitted through the channel from entering the valve box and accumulating therein at all levels of opening.

The movable portions, i.e., the portions between the valve unit and the wedge plate and between the valve unit and the guide plate, are sealed by making surface contact, thus allowing high durability and improved sealing efficiency.

By operating the first urging member and the second urging member to adjust the position of the wedge plate, the contact pressure of the first sealing member and the second sealing member, and the contact surface force between the valve unit and the wedge plate and between the valve unit and the guide plate can be adjusted, and that state be maintained.

DETAILED DESCRIPTION OF THE INVENTION

A gate valve 1 according to an embodiment of the present invention will be described below using FIGS. 1 to 10. The gate valve 1 according to this embodiment is used for transport lines for transporting high-temperature particulate materials.

Figure 1:
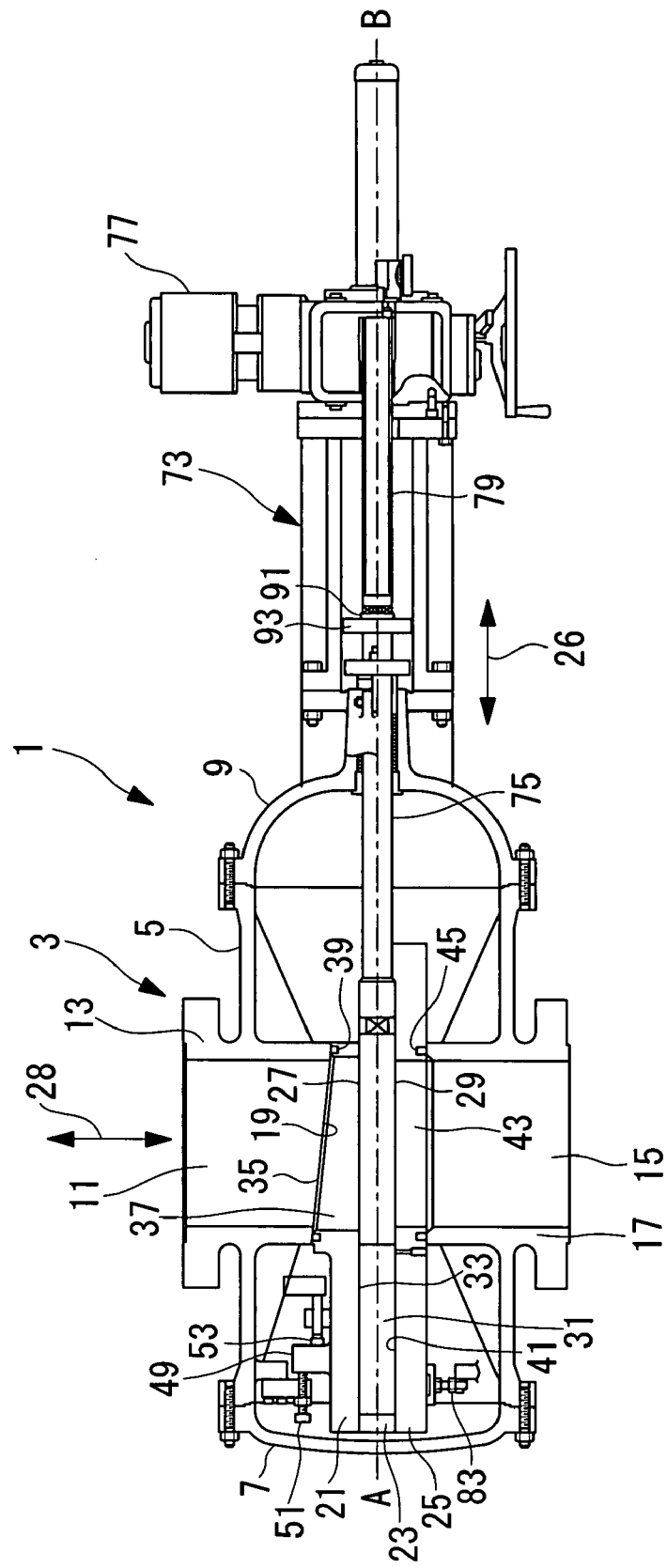
FIG. 1 is a sectional view showing the front of a gate valve according to an embodiment of the present invention.
Figure 2:
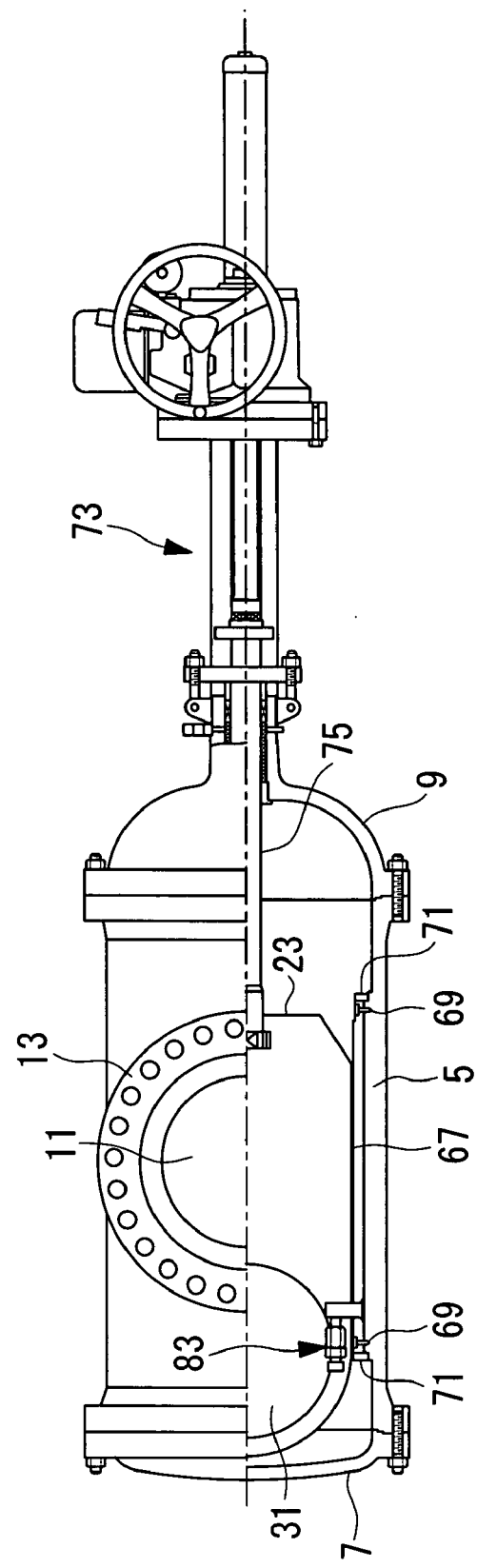
FIG. 2 is a plan view in FIG. 1.

FIG. 1 is a front view showing a cross section of the gate valve 1. FIG. 2 shows a top view of the gate valve 1, and a cross section thereof is shown in the lower half of FIG. 2.

A valve box 3 includes a substantially cylindrical valve box body 5, a lid (opening portion) 7 at a first end for opening and closing a first end (A) of the valve box body 5, and a lid 9 at a second end for opening and closing a second end (B) of the valve box body 5.

The valve box body 5 is disposed so that the axial direction thereof is horizontal. An inlet portion 13 with an inlet channel 11 and an outlet portion 17 with an outlet channel 15 are provided at substantially the midpoint in the axial direction (opening-and-closing direction) 26 of the valve box body 5. The axial centers of the inlet channel 11 and the outlet channel 15 extend in the vertical direction (channel axis direction) 28 on substantially the same line.

The inner end of the inlet portion 13 has an inclined surface 19 opening towards the first end.

A wedge plate 21, a valve unit 23, and a guide plate 25 are provided between the inlet portion 13 and the outlet portion 17 in this order from the inlet portion 13 side, each horizontally extending in the axial direction (opening-and-closing direction) 26 of the valve box body 5.

The valve unit 23 is a substantially rectangular plate member having a semicircular protrusion at the first-end portion and includes an upper sliding surface (first sliding surface) 27 at the top and a lower sliding surface (second sliding surface) 29 at the bottom. In addition, the valve unit 23 has a valve unit channel 31 that is disposed closer to the first end than the midpoint in the opening-and-closing direction 26 and passes from the upper sliding surface 27 to the lower sliding surface 29.

The wedge plate 21 is a substantially oval plate member and has a wedge-plate sliding surface (third sliding surface) 33 that is in surface contact with the upper sliding surface 27 of the valve unit 23. The wedge plate 21 has an inclined supporting surface 35 protruding in the form of a cylinder on the inlet portion 13 side at a position closer to the second end than substantially the midpoint in the opening-and-closing direction 26. The height of the upper end of the inclined supporting surface 35 gradually reduces toward the second end. A wedge-plate channel 37 passing from the inclined supporting surface 35 to the wedge-plate sliding surface 33 is provided. An annular groove 39 around the circumference of the wedge-plate channel 37 is provided on the inclined supporting surface 35. In addition, the wedge-plate sliding surface 33 extends from the first-end portion of the wedge plate 21 to the first-end portion of the wedge-plate channel 37 so as to have a length equal to or greater than the diameter of at least the valve unit channel 31.

The guide plate 25 is a substantially rectangular plate member having a semicircular protrusion at the first-end portion, and has a guide-plate sliding surface (the fourth sliding surface) 41 that is in surface contact with the lower sliding surface 29 at the valve unit 23 side.

A guide-plate channel 43 passing through in a vertical direction 28 is provided in the guide plate 25 at a position closer to the second end than substantially the midpoint in the opening-and-closing direction 26. The guide-plate sliding surface 41 extends from the first-end portion of the guide plate 25 to the first-end portion of the guide-plate channel 43 so as to have a length equal to or greater than the diameter of at least the valve unit channel 31. In addition, the second-end portion of the guide plate 25 is disposed closer to the second end than a center of gravity of the combined guide plate 25, valve unit 23, and wedge plate 21 when the valve unit channel 31 overlaps with the guide-plate channel 43.

A guide-plate annular groove 45 around the circumference of the guide-plate channel 43 is provided at the outlet portion 17 side of the guide plate 25.

A protrusion 47 (see FIG. 8) around the circumference of the outlet channel 15 is provided on the upper surface of the outlet portion 17 so as to fit in the guide-plate annular groove 45.

Next, a seal structure between the wedge plate 21 and the inlet portion 13, and between the guide plate 25 and the outlet portion 17 will be described using FIGS. 7 to 9.

Figure 7:
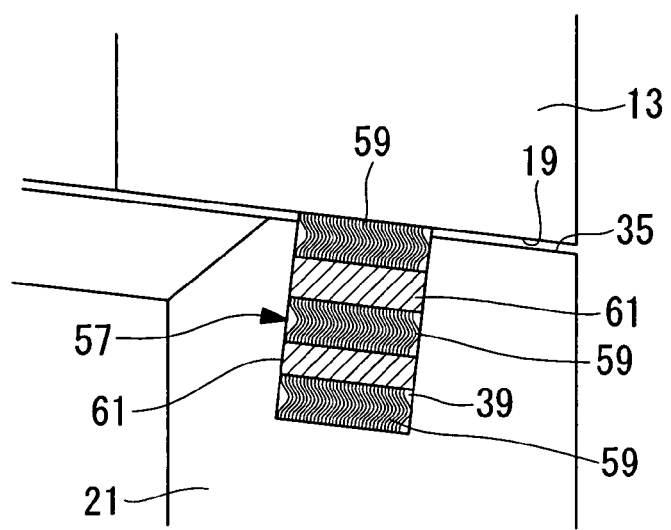
FIG. 7 is a sectional view showing a sealing gasket according to an embodiment of the present invention.

As shown in FIG. 7, an inlet-portion seal-gasket (first sealing member) 57 is provided in the annular groove 39 of the wedge plate 21 so as to protrude from the inclined supporting surface 35. The inlet-portion seal-gasket 57 is formed of three spiral wound gaskets 59 and two sealing plates 61.

Figure 8:
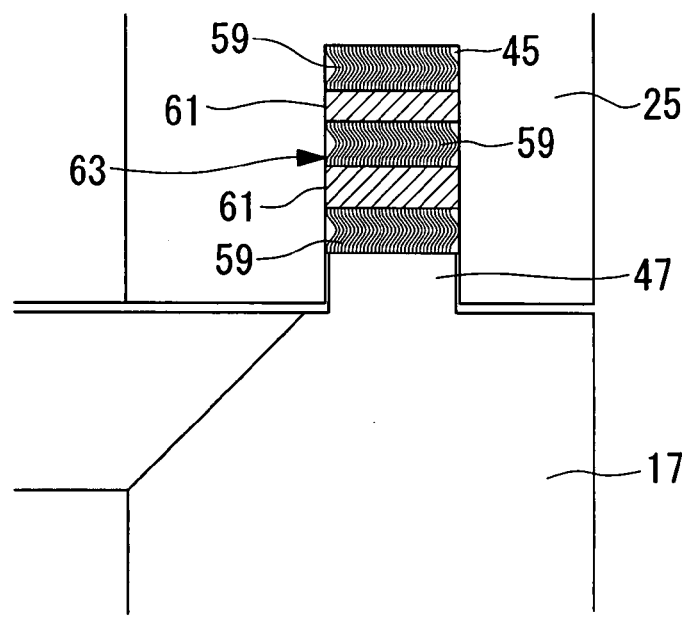
FIG. 8 is a partial sectional view showing a guide-plate sealing gasket according to an embodiment of the present invention.

As shown in FIG. 8, an outlet-portion sealing gaskets 63 having the same structure as the inlet-portion seal-gasket 57 is provided between the guide-plate annular groove 45 of the guide plate 25 and the protrusion 47 of the outlet portion 17.

Figure 9:
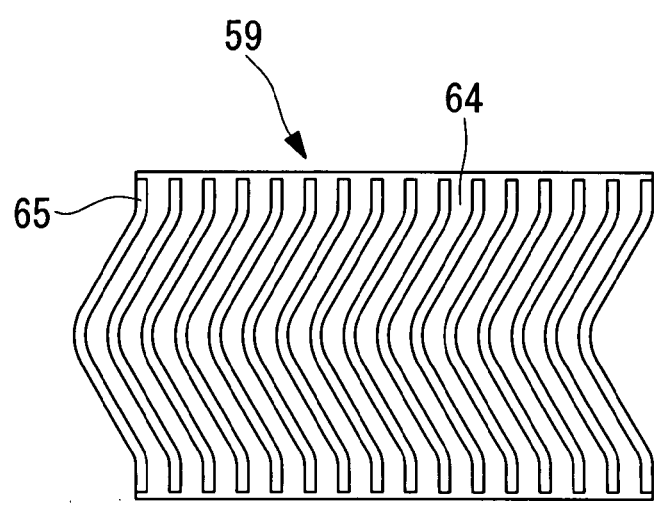
FIG. 9 is a sectional view showing a spiral wound gasket according to an embodiment of the present invention.

As shown in FIG. 9, the spiral wound gasket 59 has a plurality of metal hoop members 65 disposed in a filler 64 with predetermined spaces. The hoop members 65 are bent substantially in the shape of a letter V and are configured so that they can elastically deform in the vertical direction.

The sealing plates 61 are made of metal, are disposed in close contact with the walls of the annular groove 39 and the guide-plate annular groove 45, and have a function of maintaining air-tightness.

When the hoop members 65 are used in an elastic deformation range, the hoop members 65 behave like a spring to ensure resiliency. Accordingly, the number of spiral wound gasket 59 is, determined so that the level of compression per gasket is within the elastic deformation range of the hoop members 65.

In addition, because the restoring forces of the inlet-portion sealing gasket 57 and the outlet-portion sealing gasket 63 are contact surface forces between the metal sliding surfaces of the valve unit 23 and the wedge plate 21, and the valve unit 23 and the guide plate 25, when the contact surface force of the metal sliding surfaces is too strong due to the increased reaction force of the gasket generated during absorption of the thermal expansion, the metal sliding surfaces are damaged by seizing and so forth.

Accordingly, by stacking the plurality of spiral wound gaskets 59, an increase of the contact surface force of the metal sliding surfaces during absorption of the thermal expansion is reduced. Therefore, the number of spiral wound gaskets 59 is determined considering also the limit contact surface force of the metal sliding surfaces.

The spiral wound gasket 59 is usually compressed to be 1.2 mm thick per sheet; in this embodiment, the compression is limited to ¼ to ⅕ (0.24 mm to 0.3 mm), considering the increased reaction forces of the inlet-portion sealing gasket 57 and the outlet-portion sealing gasket 63 due to restoration and thermal expansion.

A protruding portion 49 is provided on an upper surface of the first end of the wedge plate 21. An adjusting bolt (first urging member) 51 screwed into the valve box body 5 at the first end of the protruding portion 49 and a bolt (second urging member) 53 screwed into the valve box body 5 at the second end are provided as to be capable of being screwed in.

In addition, chromium carbide ($Cr_3C_2$) is coated on the upper sliding surface 27 and the lower sliding surface 29 of the valve unit 23, on the wedge-plate sliding surface 33 of the wedge plate 21, and on the guide-plate sliding surface 41 of the guide plate 25. $Cr_3C_2$ has excellent sliding characteristics at high temperature, resulting in much less damage to the object materials, and is wear-resistant and corrosion-resistant in a particulate environment.

Leading plates 67, which are parallel to both surfaces of the valve unit 23, are removably attached to an inner circumferential surface of the valve box body 5 using bolts 69 with a small gap between the leading plates 67 and the valve unit 23. Guards 71 fitted to the valve box body 5 are provided at both ends of the leading plate 67 in the opening-and-closing direction 26. A material exhibiting excellent metal sliding and corrosion-resistance properties, for example, a cobalt-base alloy, is used on the sliding surfaces of the leading plates 67.

Next, a moving device 73 will be described. The moving device 73 is disposed at the second end of the valve box 3. When a rotational driving force is applied to a rotating body by an operating mechanism 77 or a handle, a screw stem 79 threaded with the rotating body moves in the opening-and-closing direction 26. A valve stem 75 attached to the first-end portion of the screw stem 79 moves in the opening-and-closing direction 26 together with the movement of the screw stem 79.

An engaging portion 55 that is formed in an inverted T-shape and whose inner side is wider in plan view is provided at the second-end portion of the valve unit 23. A hanger portion 81 is provided at the first-end portion of the valve stem 75.

Figure 6:
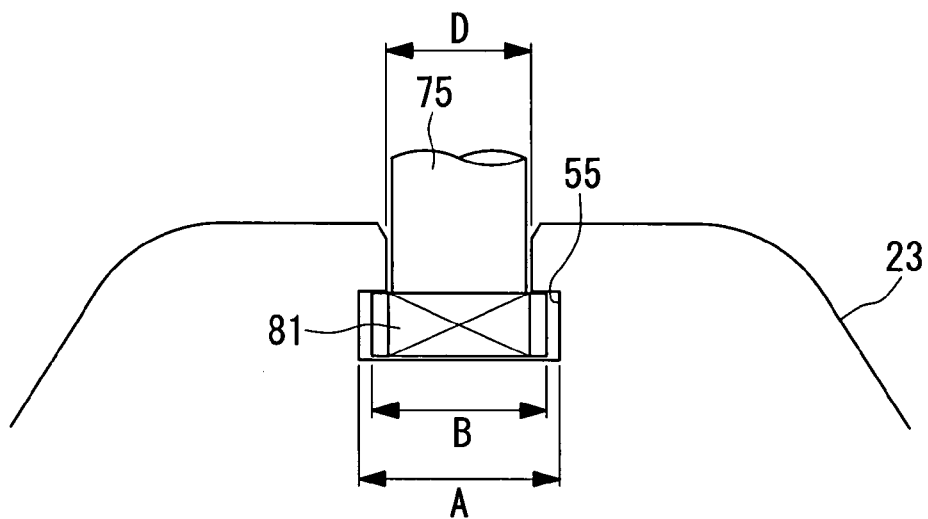
FIG. 6 is a plan view showing a second-end portion of a valve unit according to an embodiment of the present invention.

The hanger portion 81 is a block having an oval shape in cross section and is configured so that the length of the minor axis is shorter than the width D of an entrance of the engaging portion 55, and the length of the major axis B is longer than the width D of the entrance of the engaging portion 55 and shorter than the width A of the wide portion of the engaging portion 55. Accordingly, as shown in FIG. 6, when the major axis of the hanger portion 81 is engaged with the wide portion of the engaging portion 55, the valve unit 23 moves in the opening-and-closing direction 26 together with the movement of the valve stem 75 in the opening-and-closing direction. On the other hand, when the valve stem 75 is rotated by 90° from the state shown in FIG. 6, it is not engaged with the engaging portion 55 because the minor axis of the hanger portion 81 is located in an engaging positional relationship.

Figure 10:
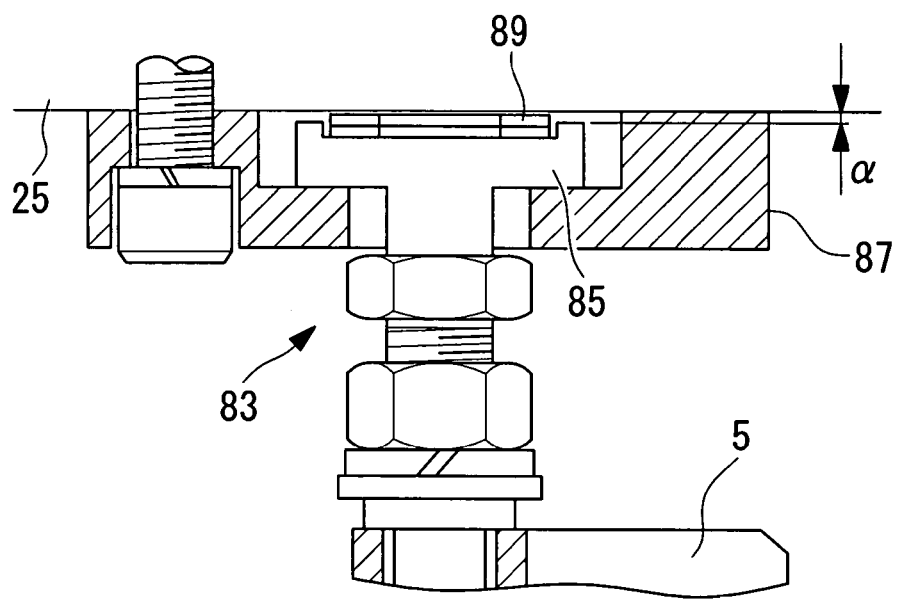
FIG. 10 is a partially cutaway front view showing a holding portion according to an embodiment of the present invention.
Figure 11:
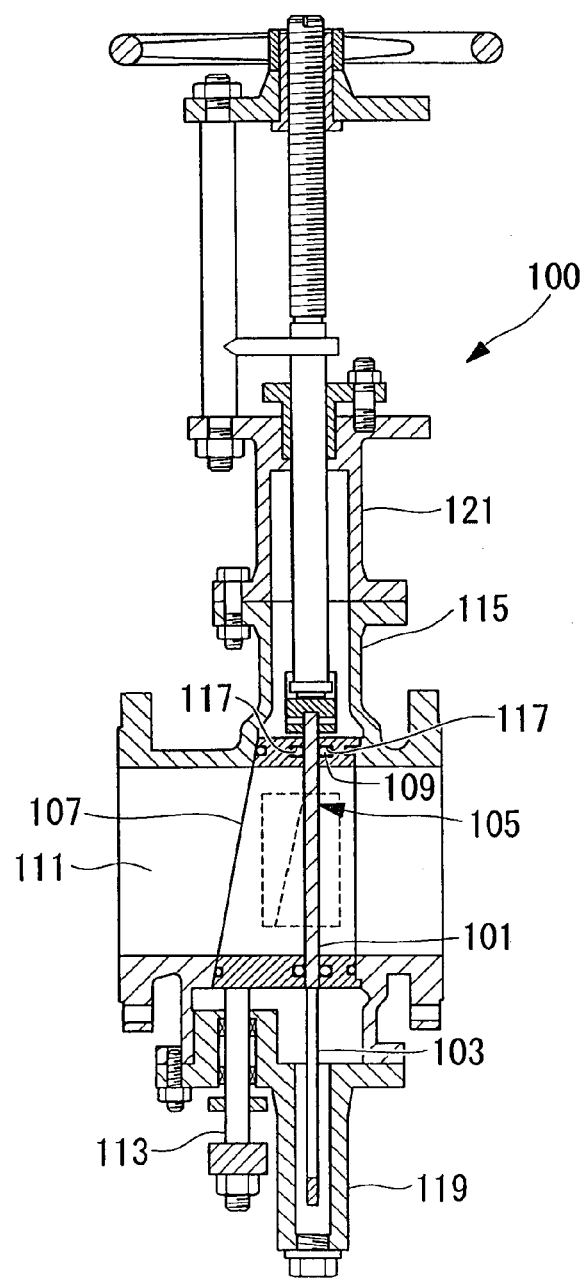
FIG. 11 is a longitudinal sectional view showing a known gate valve.

Next, holding portions 83 will be explained also with reference to FIG. 10.

A pair of holding portions 83 is provided at either side substantially below the end at the first end of the guide plate 25. Holding shafts 85 that are attached so as to be capable of moving in the vertical direction with respect to the valve box body are provided on each holding portion 83. The upper portion of the holding shaft 85 is configured to be expanded, and the lower portion of the large-diameter portion thereof is configured to be supported by a holding-shaft mounting plate 87 which is fixed to the bottom of the guide plate 25.

An appropriate gap a to allow thermal expansion of the valve box 3 is provided between the guide plate 25 and the upper end of the holding shaft 85. A spring 89 that balances the weights of the guide plate 25, the valve unit 23, and the wedge plate 21 is mounted between the holding shaft 85 and the guide plate 25.

The operation of the gate valve 1 according to this embodiment will be described.

First, adjustment of a contact surface force of a seal will be described.

When the protruding portion 49 is urged to the second end in the opening-and-closing direction 26 using the adjusting bolt 51, the wedge plate 21 is urged in the same direction. By doing so, the spiral wound gasket 59 of the sealing gasket 57 is compressed because the inclined supporting surface 35 of the wedge plate 21 approaches the inclined surface 19 of the inlet portion 13. When the spiral wound gasket 59 is compressed, the wedge plate 21 is pressed against the valve unit 23 by its restoring force. Because this pressing force is transmitted from the valve unit 23 to the guide plate 25, and further transmitted from the guide plate 25 to the guide-plate sealing gasket 63, it is possible to increase the contact pressure and the contact surface force between the sealing gasket 57 and the inclined surface 19, between the wedge-plate sliding surface 33 and the upper sliding surface 27, between the lower sliding surface 29 and the guide-plate sliding surface 41, and between the guide-plate sealing gasket 63 and the protrusion 47. By urging the protruding portion 49 to the second end using the bolt 53, the wedge plate 21 can be fixed in this increased-force state.

In contrast, by loosening the adjusting bolt 51 and urging the protrusion 49 to the first end in the opening-and-closing direction 26 using the bolt 53, the sealing gasket 57 expands because the inclined supporting surface 35 of the wedge plate 21 is separated from the inclined surface 19 of the inlet portion 13. When the sealing gasket 57 expands, the reaction force of the sealing gasket 57 decreases, the contact pressure of the sealing gasket 57 and the guide-plate sealing gasket 63, and the contact surface force between the valve unit 23 and the wedge plate 21 and between the valve unit 23 and the guide plate 25 can be decreased. By operating the adjusting bolt 51 to urge the protruding portion 49 to the first end, this reduced-force state can be maintained.

In this way, by operating the adjusting bolt 51 and the bolt 53 to finely adjust the position of the wedge plate 21 in the opening-and-closing direction 26 as necessary, the contact pressure of the sealing gasket 57 and the guide-plate sealing gasket 63, and the contact surface force between the valve unit 23 and the wedge plate 21 and between the valve unit 23 and the guide plate 25 can be adjusted, and that state be maintained.

Next, the opening and closing operation of the gate valve 1 will be described with reference to FIGS. 3A to 5C.

Figure 3A:
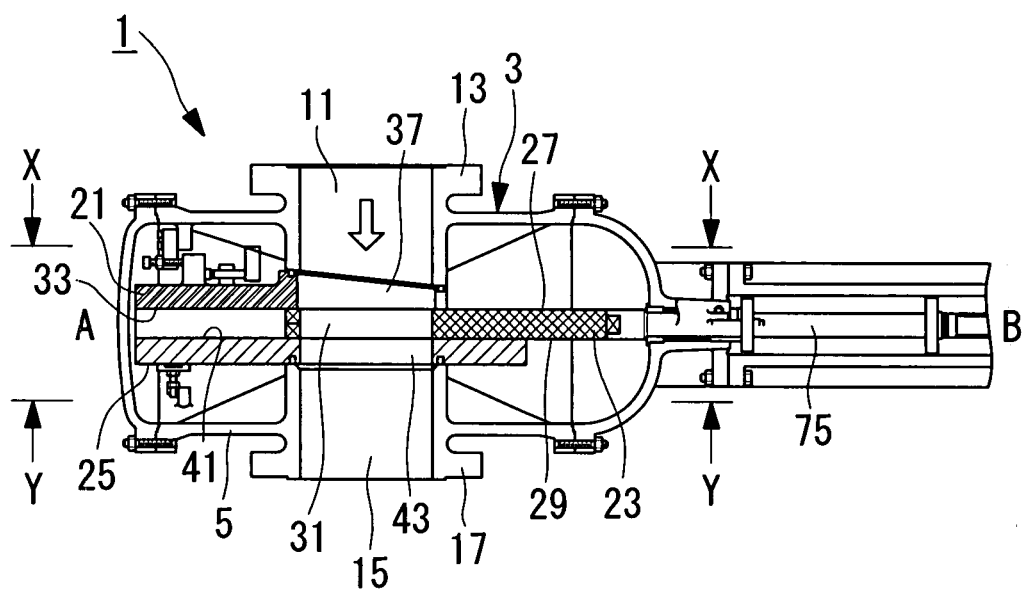
FIG. 3A is a front sectional view showing a fully opened state of the gate valve according to an embodiment of the present invention.
Figure 3B:
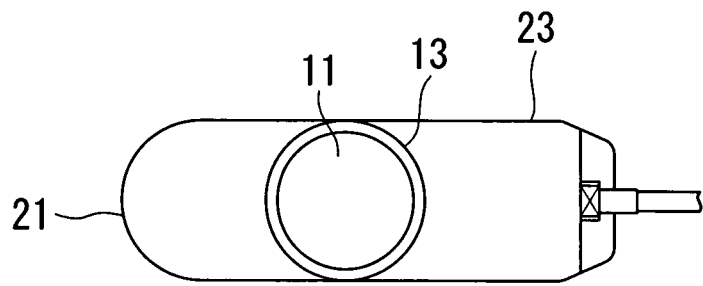
FIG. 3B is a sectional view taken along line X-X of FIG. 3A.
Figure 3C:
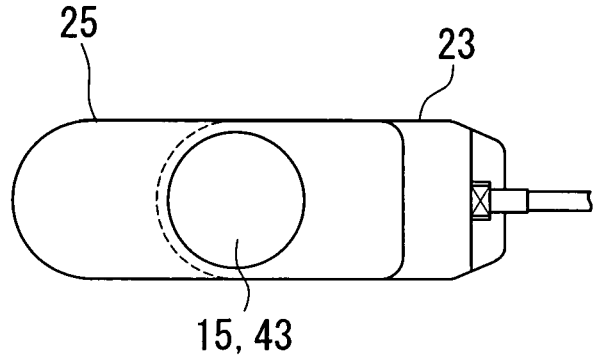
FIG. 3C is a sectional view taken along line Y-Y of FIG. 3A.
Figure 4A:
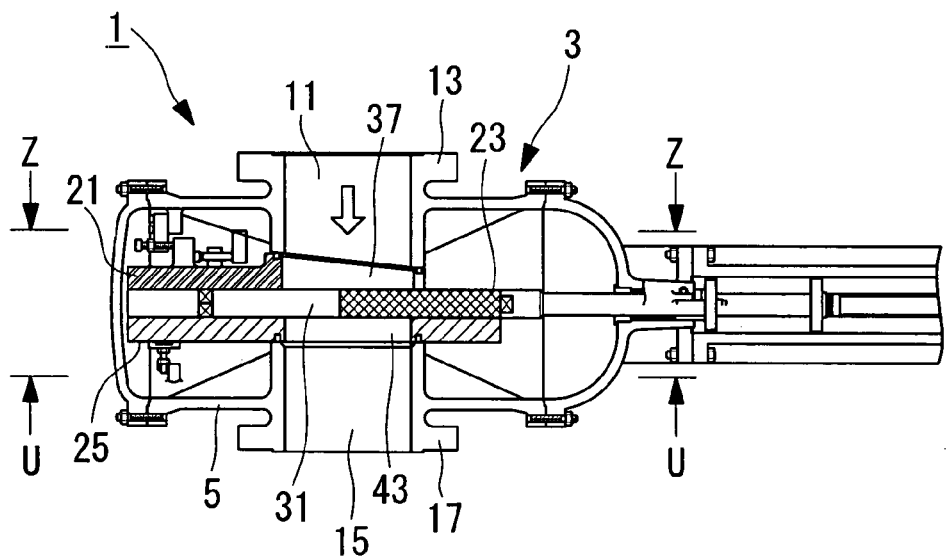
FIG. 4A is a front sectional view showing a partially opened state of the gate valve according to an embodiment of the present invention.
Figure 4B:
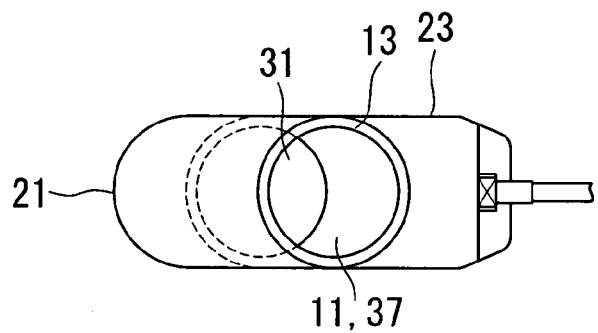
FIG. 4B is a sectional view taken along Z-Z of FIG. 4A.
Figure 4C:
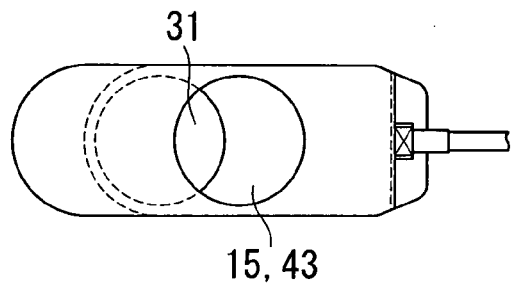
FIG. 4C is a sectional view taken along U-U of FIG. 4A.
Figure 5A:
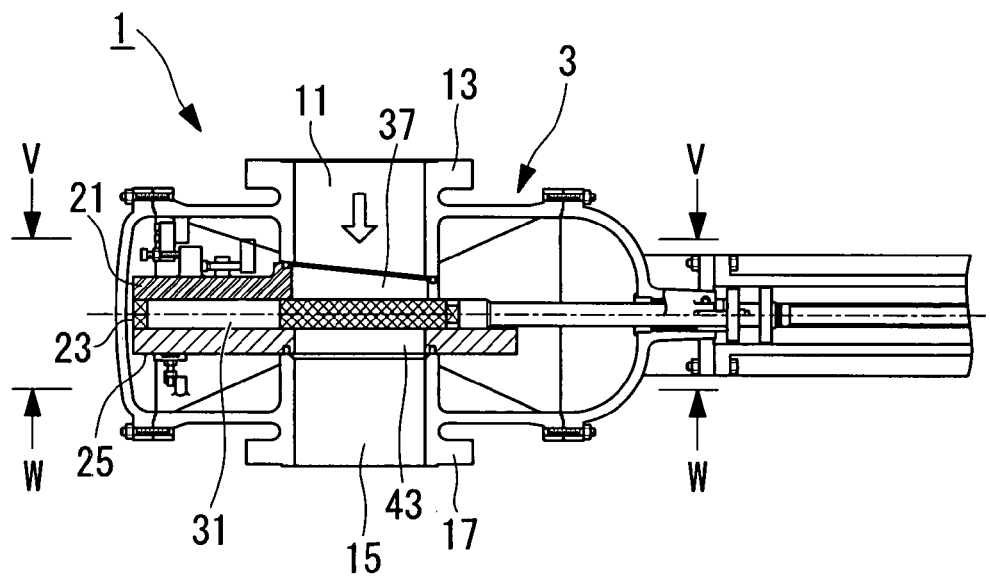
FIG. 5A is a front sectional view showing a closed state of the gate valve according to an embodiment of the present invention.
Figure 5B:
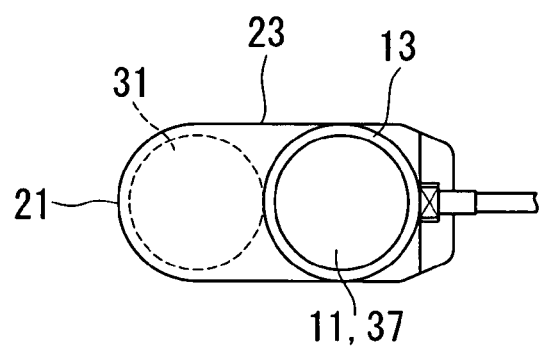
FIG. 5B is a sectional view taken along V-V of FIG. 5A.
Figure 5C:
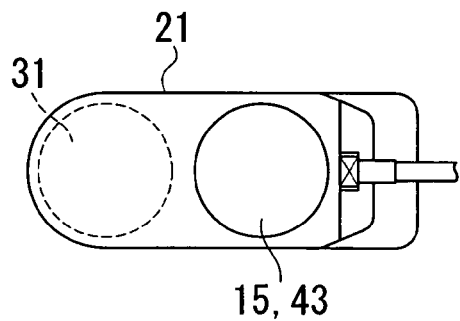
FIG. 5C is a sectional view taken along W-W of FIG. 5A.

FIGS. 3A to 3C show a state in which the gate valve 1 is fully opened, FIGS. 4A to 4C show a state in which the gate valve 1 is opened, and FIGS. 5A to 5C show a state in which the gate valve 1 is fully closed.

A fluid channel is formed in the gate valve 1 by the inlet channel 11, the wedge-plate channel 37, the guide-plate channel 43, and the outlet channel 15. When the valve unit 23 is slid by the moving device 73 in the opening-and-closing direction 26, and when the valve unit channel 31 overlaps with the wedge-plate channel 37 of the wedge plate 21 and the guide-plate channel 43 of the guide plate 25, a channel passing in the vertical direction is formed; that is, the gate valve is opened.

FIGS. 3A to 3C show the state in which the valve unit 23 moves to the extremity at the second end, and the valve unit channel 31 substantially completely overlaps with the wedge-plate channel 37 and the guide-plate channel 43; that is, the gate valve 1 is fully opened.

In this state, when the valve unit 23 is slid by the moving device 73 to the first end in the opening-and-closing direction 26 along the wedge-plate sliding surface 33 of the wedge plate 21 and the guide-plate sliding surface 41 of the guide plate 25, the valve unit channel 31 moves to the first end, and the overlapping portion of the wedge-plate channel 37 of the wedge plate 21 and the guide-plate channel 43 of the guide plate 25 gradually decreases in size (see FIGS. 4A to 4C), and finally they do not overlap (see FIGS. 5A to 5C). In other words, the gate valve 1 is closed.

At this time, the channel formed by the inlet channel 11 and the wedge-plate channel 37 of the wedge plate 21 is sealed by the sealing gasket 57, and the channel formed by the outlet channel 15 and the guide-plate channel 43 of the guide plate 25 is sealed by the guide-plate sealing gasket 63.

The wedge plate 21 is provided with the wedge-plate sliding surface 33 having a length equal to or greater than the diameter of at least the valve unit channel 31 at the first end of the wedge-plate channel 37 in the opening-and-closing direction. The guide plate 25 is provided with the guide-plate sliding surface 41 having a length equal to or greater than the diameter of at least the valve unit channel 31 at the first end of the guide-plate channel 43 in the opening-and-closing direction. Accordingly, the valve unit channel 31 is covered by the wedge-plate sliding surface 33 and the guide-plate sliding surface 41 while the valve unit 23 slides from fully open to fully closed. In other words, the opening plane of the valve unit channel 31 is covered by the wedge-plate sliding surface 33 and the guide-plate sliding surface 41 at all times during the opening and closing operation of the gate valve 1.

Because the valve unit channel 31 is provided closer to the first end than the midpoint of the valve unit 23 in the opening-and-closing direction 26, the upper sliding surface 27 and the lower sliding surface 29, which are longer than the diameter of the valve unit channel 31, are provided at the second end of the valve unit channel 31. Accordingly, the wedge-plate channel 37 is covered and sealed by the upper sliding surface 27 of the valve unit 23, and the guide-plate channel 43 is covered and sealed by the lower sliding surface 29 of the valve unit 23 during the time from when the valve unit 23 is in the fully opened state (see FIGS. 3A to 3C) to when the gate valve 1 is closed by sliding to the first end (see FIGS. 5A to 5C).

In this way, because a portion between the fluid channel and a space inside the valve box 3 is sealed at all levels of opening, it is possible to prevent the fluid containing particulate materials transmitted through the channel from entering the valve box 3 and accumulating therein.

The movable portions, i.e., the portions between the valve unit 23 and the wedge plate 21 and between the valve unit 23 and the guide plate 25, are sealed by making surface contact with each of the sliding surfaces, thus allowing high durability and improved sealing efficiency.

Because a layer of chromium carbide is coated on the upper sliding surface 27, the lower sliding surface 29, the wedge-plate sliding surface 33, and the guide-plate sliding surface 41, the sealing characteristics of these sliding surfaces can be maintained for a long time even when they slide in high-temperature, corrosive environments, as well as in particulate environments.

The wedge plate 21, valve unit 23, and the guide plate 25 are supported by the outlet portion 17 and the holding portions 83.

The center of gravity of the wedge plate 21 and the guide plate 25 is towards the first end. Accordingly, the center of gravity of the wedge plate 21, the valve unit 23, and the guide plate 25 is positioned closer to the first end than the guide-plate channel 43, regardless of the position of the valve unit 23. A downward moment is thus always exerted at the first-end portion of the guide plate 25.

Because this downward moment is supported by the spring 89 provided between the holding shaft 85 and the guide plate 25, the guide plate 25, the valve unit 23, and the wedge plate 21 are always kept horizontal.

Because the second-end portion of the guide plate 25 extends closer to the second end than the guide-plate channel 43, the valve unit 23 is guided by the guide plate 25, even when the valve unit 23 having the center of gravity closer to the second end than the valve unit channel 31 moves to the second end.

Therefore, the valve unit 23 is supported by the guide plate 25 and slides substantially horizontally; thus, a stable motion can be realized.

In addition, adjustment of the horizontal angle of the guide plate 25 is performed by raising and lowering the holding shaft 85.

Because an appropriate gap a to allow thermal expansion of the valve box 3 is provided between the guide plate 25 and the holding shaft 85, the holding shaft 85 does not abut against and press the guide plate 25 upward, even when the valve box 3 thermally expands.

Because the valve unit 23 is coupled to, for example, the valve stem 75 with a gap therebetween, there is a possibility that it may shift from side to side during operation. In addition, the valve unit 23 may also rock due to the presence of a small amount of particulate materials adhering to the sliding surfaces.

When the valve unit 23 rocks from side to side during sliding, it slides while abutting against the leading plate 67, which prevents the problem of the valve unit 23 abutting against the valve box body 5. Because the leading plate 67 is made of a material exhibiting excellent mechanical sliding properties, seizure and scoring do not occur even during contact and sliding. The sliding motion of the leading plate 67 is limited by the guard 71, even when the valve unit 23 slides in contact with the leading plate 67.

Because the leading plate 67 is provided on the valve box body 5 in a detachable manner, when the valve unit 23 becomes worn due to contact and sliding, maintenance can be easily carried out by changing only the leading plate 67.

By providing the guard 71, play of the guide caused by a load in the stroke direction can be prevented.

Next, disassembly and inspection of the gate valve 1 will be described.

When the interior is checked, the lid at the first end 7 is removed, thereby widely opening the first end. By visually examining the sliding paths of the wedge plate 21 and the guide plate 25 via this opening, and determining the degree of wear and tear to the sliding surfaces, including the valve unit 23 or other parts, it is possible to determine in advance whether or not inspection is required.

In addition, by checking for particulate materials left inside the valve box 3, it is possible to determine whether or not it is necessary to perform adjustment and inspection of the contact pressure of the sealing gasket 57 and the guide-plate sealing gasket 63, and the contact surface force between the upper sliding surface 27 and the wedge-plate sliding surface 33, and between the guide-plate sliding surface 41 and the lower sliding surface 29.

The valve unit 23 is removed from the opening portion by rotating the valve stem 75 by 90° and disengaging the valve stem 75 from the valve unit 23. In this state, a working space is provided, allowing the wedge plate 21 and the guide plate 25 to be removed. Accordingly, maintenance, such as inspection, replacement, and assembly, can be performed inside the valve box 3 without removing the valve box 3 from the pipe in which it is installed.

New parts can be easily assembled by following this procedure in reverse. A valve-rod rotation lock 91 is fixed to the valve stem 75 with a tapered pin 93, thus preventing it from disengaging from the valve unit 23 during operation.

What is claimed is:

1. A gate valve installed in a transport line for transporting fluid containing particulate material at a coal gasification plant, comprising:
    a valve box having an inlet portion and an outlet portion in which a channel constituting a part of the transport line is formed;
    a valve unit, provided between the inlet portion and the outlet portion, which extends in an opening-and-closing direction orthogonal to an axial direction of the channel, and which is movable in the opening-and-closing direction;
    a wedge plate provided between the valve unit and the inlet portion so as to extend in the opening-and-closing direction;
    a guide plate provided between the valve unit and the outlet portion so as to extend in the opening-and-closing direction; and
    a moving device engaged with the valve unit and configured to move the valve unit in the opening-and-closing direction,
    wherein the valve unit is provided with a first sliding surface at the inlet portion side and a second sliding surface at the outlet portion side, which are substantially orthogonal to the channel and substantially parallel to each other, and a valve unit channel passing through so as to form a part of the channel is provided closer to a first end than a midpoint in the opening-and-closing direction;
    the wedge plate is provided with a third sliding surface that is in surface contact with the first sliding surface at the valve unit side and an inclined supporting surface which is provided closer to a second end than substantially the midpoint in the opening-and-closing direction at the inlet portion side and whose height gradually reduces toward the second end, and a wedge-plate channel that passes from the inclined supporting surface toward the third sliding surface and that forms a part of the channel is provided so that the third sliding surface has a length equal to or greater than the diameter of at least the valve unit channel at the first end in the opening-and-closing direction;
    the guide plate is provided with a fourth sliding surface that is in surface contact with the second sliding surface at the valve unit side, and a guide-plate channel that passes through so as to form a part of the channel is provided so that the fourth sliding surface has a length equal to or greater than the diameter of at least the valve unit channel at the first end in the opening-and-closing direction;
    an inclined surface opposing the inclined supporting surface is formed at an inner end portion of the inlet portion;
    a first sealing member having elasticity is mounted between the inclined surface and a wedge-plate annular groove provided around the wedge-plate channel of the inclined supporting surface;
    a second sealing member having elasticity is mounted between the guide plate and the outlet portion so as to surround the channel; and
    the valve box is provided with a first urging member capable of urging the wedge plate to the second end in the opening-and-closing direction, and a second urging member that is disposed at the second end, in the opening-and-closing direction, of the first urging member and that is capable of urging the wedge plate to the first end in the opening-and-closing direction.

2. A gate valve according to claim 1, wherein
the moving device is disposed at one of the first end and the second end of the valve unit and is detachably engaged with the valve unit; and
an opening portion capable of opening and closing is provided at an opposite side, in the opening-and-closing direction, from the moving device of the valve box.

3. A gate valve according to claim 1, wherein
coating layers are provided on the first sliding surface, the second sliding surface, the third sliding surface, and the fourth sliding surface.

4. A gate valve according to claim 1, wherein
the first sealing member and the second sealing member are formed of spiral wound gaskets having a plurality of elasticities in a channel axial direction and a metal sealing plate interposed between each spiral wound gasket.

5. A gate valve according to claim 1, wherein
the channel is formed in substantially the vertical direction such that the outlet portion is disposed at a lower end thereof;
the second-end portion of the guide plate is disposed so as to extend closer to the second end than the guide-plate channel;
the valve box is provided with a holding portion, between the valve box and the guide plate, substantially below the end at the first end of the guide plate, with a gap therebetween to allow thermal expansion of the valve box; and
a spring having a spring force for supporting weights of the guide plate, the valve unit, and the wedge plate is disposed between the holding portion and the guide plate.

6. A gate valve according to claim 1, wherein
a leading plate is removably provided on an inner surface of the valve box opposing the valve unit, with a small gap therebetween.

* * * * *